(12) United States Patent
Brand et al.

(10) Patent No.: US 10,663,035 B2
(45) Date of Patent: May 26, 2020

(54) APPARATUS FOR DE-ICING THE CASING TUBE OF A TENDON

(71) Applicant: DYWIDAG—Systems International GmbH, München (DE)

(72) Inventors: Werner Brand, Freising (DE); Michael Bauer, Unterschleißheim (DE); Marcel Kasper, München (DE)

(73) Assignee: DYWIDAG-SYSTEMS INTERNATIONAL GMBH, München (DE)

(*) Notice: Subject to any disclaimer, the term of this patent is extended or adjusted under 35 U.S.C. 154(b) by 0 days.

(21) Appl. No.: 15/879,914

(22) Filed: Jan. 25, 2018

(65) Prior Publication Data

US 2018/0291983 A1    Oct. 11, 2018

(30) Foreign Application Priority Data

Apr. 11, 2017   (DE) .................. 10 2017 206 257

(51) Int. Cl.
*H02G 7/16* (2006.01)
*F16H 1/10* (2006.01)
(Continued)

(52) U.S. Cl.
CPC .............. *F16H 1/10* (2013.01); *E01D 19/14* (2013.01); *F15B 15/14* (2013.01); *F16H 25/186* (2013.01); *H02G 7/16* (2013.01); *E01D 19/00* (2013.01)

(58) Field of Classification Search
CPC ......... E01D 11/00; E01D 11/02; E01D 11/04; E01D 19/14; H02G 7/16
(Continued)

(56) References Cited

U.S. PATENT DOCUMENTS

| | | | |
|---|---|---|---|
| 2,797,344 A * | 6/1957 | Peirce | H02G 7/16 307/147 |
| 3,761,865 A * | 9/1973 | Bomgaars | H01R 13/58 439/451 |

(Continued)

FOREIGN PATENT DOCUMENTS

| | | |
|---|---|---|
| DE | 102011106431 | 10/2012 |
| EP | 1061204 | 12/2000 |

(Continued)

OTHER PUBLICATIONS

European Search Report filed in EP 18152926 dated Aug. 3, 2018.
German Search Report filed in DE 2017 206 257.6 dated Jan. 17, 2018.

*Primary Examiner* — Gary S Hartmann
(74) *Attorney, Agent, or Firm* — Rankin, Hill & Clark LLP

(57) ABSTRACT

An apparatus is configured to de-ice a surface of a casing tube of a tendon that is exposed to weather influences, or to guard the case tube against ice forming on the case tube, where the tendon is anchored to a structure by an anchoring device. The apparatus includes a power device, one end of which is directly or indirectly in force transmitting engagement with the anchoring device and the other end is directly or indirectly in force transmitting engagement with the casing tube. The power device is configured to move the casing tube relative to the anchoring device in the circumferential, radial and/or axial direction in relation to the longitudinal extension direction of the casing tube.

11 Claims, 8 Drawing Sheets

(51) Int. Cl.
  *E01D 19/14* (2006.01)
  *F15B 15/14* (2006.01)
  *F16H 25/18* (2006.01)
  *E01D 19/00* (2006.01)

(58) Field of Classification Search
  USPC .................................. 14/21, 22; 174/40 TD
  See application file for complete search history.

(56) References Cited

U.S. PATENT DOCUMENTS

| | | | | |
|---|---|---|---|---|
| 3,835,269 | A * | 9/1974 | Levin | B60L 5/02 |
| | | | | 191/62 |
| 6,518,497 | B1 | 2/2003 | Allaire et al. | |
| 8,347,812 | B2 * | 1/2013 | Lundgren | E01D 19/16 |
| | | | | 118/712 |
| 8,373,095 | B2 * | 2/2013 | Huynh | H02G 7/16 |
| | | | | 174/40 R |
| 9,062,421 | B2 * | 6/2015 | Brand | E01D 19/16 |
| 10,113,278 | B1 * | 10/2018 | Carney | E01D 19/16 |
| 2004/0065458 | A1 | 4/2004 | Hansen | |
| 2007/0278349 | A1 * | 12/2007 | Bembridge | H02G 7/16 |
| | | | | 244/134 R |
| 2010/0243633 | A1 * | 9/2010 | Huynh | H02G 7/16 |
| | | | | 219/209 |

FOREIGN PATENT DOCUMENTS

| | | |
|---|---|---|
| KR | 101704684 | 2/2017 |
| WO | 2007/114785 | 10/2007 |

\* cited by examiner

APPARATUS FOR DE-ICING THE CASING TUBE OF A TENDON

BACKGROUND OF THE INVENTION

The invention relates to an apparatus that is designed and intended for de-icing the surface of a casing tube of a tendon, which tube is exposed to weather influences, and/or to guard against, if not completely prevent, ice forming on said tube, the tendon being anchored to a structure by means of an anchoring device.

The formation of ice on the outer surface of the casing tubes of tendons that are built on structures, for example the formation of ice on the outer surface of the casing tubes of stay cables of bridges, poses considerable problems for the companies or authorities responsible for operating the structures. It may therefore be the case, for example, that stay cable bridges have to be closed to traffic in order to prevent vehicles travelling over the bridge from being damaged or, even worse, the passengers of said vehicles from being injured, by falling lumps of ice that have broken away from the stay cables.

Various procedures have been used in the past to remove the ice from the stay cables:

For example, workers were transported along the stay cables in lifting cages of cranes, so that said workers could chip the ice from the stay cables. Attempts were also made to cause the stay cables to oscillate, by means of helicopters flying close to the bridge, so that the ice broke off the stay cables. These two approaches were highly time-consuming, laborious and ineffective.

A further procedure consisted in allowing chain rings placed around the stay cables to slide along the stay cable, one after the other, from the upper anchoring device to the lower anchoring device. This solution is disadvantageous, however, in that the chain rings on the lower anchoring device have to be removed from the stay cable and transported back to the upper anchoring device. Furthermore, damage to the rain-repelling ribs arranged on the outside of the casing tube is unavoidable.

Furthermore, it is known to generate pulses by means of electromagnetic coils, which pulses spread along the casing tube and are intended to make the ice break off the casing tube mechanically. However, this approach is disadvantageous because of its high power consumption.

Finally, thermal approaches have also been explored, in which the layer of ice is intended to be melted at least in part, either by blowing warm air through the casing tube or by ohmic heating of a steel foil surrounding the casing tube, in order to make it easier for the ice to break off the casing tube. The high power consumption involved is also disadvantageous in this approach.

The object of the present invention is to provide an alternative that is cost-effective to produce and operate.

BRIEF DESCRIPTION OF THE INVENTION

This object is achieved according to the invention by an apparatus of the type mentioned at the outset, which apparatus comprises a power device, one end of which is in force transmitting engagement with the anchoring device that is not part of the subject matter of the claim, or with a part that is connected to said anchoring device in an operationally stable manner, and the other end of which power device is in force transmitting engagement with the casing tube that is likewise not part of the subject matter of the claim, or with a part that is connected to said tube in an operationally stable manner, and which power device is designed and intended to move the casing tube relative to the anchoring device in the circumferential direction and/or in the radial direction and/or in the axial direction in relation to the longitudinal extension direction of the casing tube.

The variants in which the casing tube moves in the circumferential direction around the longitudinal extension direction thereof can be implemented, for example, by a rotary drive means being arranged on one of the units, i.e. the anchoring device or the casing tube, or on an element that is connected thereto in an operationally stable manner, the output shaft of which rotary drive means supports a force transmitting element that interacts with an opposing force transmitting element that extends in the circumferential direction of the casing tube and is arranged on the other unit in each case, i.e. the casing tube or the anchoring element, or on an element that is connected thereto in an operationally stable manner.

The rotary drive means can be formed by an electric motor for example, but also by a hydraulically and/or pneumatically operated motor.

Furthermore, the force transmitting element can comprise a pinion, for example, that meshes with an annular toothing.

Advantageously, the opposing force transmitting element, for example the annular toothing, can extend over an entire 360° in this case, in order to permit continuous rotation of the casing tube in a direction of rotation. Continuous rotation of this type is not only advantageous in order to make it easier for lumps of ice and icicles to break off due to gravity and/or for snow and/or water to fall off due to gravity before said snow and/or water freezes onto the casing tube, but it can also be used to make a small residual layer of ice grow uniformly. This is particularly advantageous because uniformly thick layers of ice are less prone to the "ice galloping" effect, and therefore the damping elements preventing said effect can be smaller and therefore more cost-effective to produce.

In principle, however, it is also conceivable to generate a rotational movement of the casing tube, the direction of rotation of which movement changes in an alternating manner, for example a rotational oscillation, by means of the rotary drive means. In this case, the opposing force transmitting element, for example the annular toothing, can also extend over less than 360°.

In order to make the rotation possible, it can further be provided for the anchoring device, or the element that is connected thereto in an operationally stable manner, and the casing tube, or the element that is connected thereto in an operationally stable manner, to interact via a pivot bearing. By using a pivot bearing of this type, the frictional forces between the units which are moved relative to one another can be minimised, and therefore the rotary drive means that causes the rotation can be less powerful and therefore available at a lower cost.

In order to be able to protect the rotary drive means, the force transmitting element and the opposing force transmitting element from the influence of the weather, it is furthermore proposed that the rotary drive means, the force transmitting element and the opposing force transmitting element be arranged inside a cover tube of the anchoring device or inside an additional tube element that is connected to said cover tube in an operationally stable manner.

In principle, however, it is also conceivable to arrange the rotary drive means, the force transmitting element and the opposing force transmitting element outside the cover tube of the anchoring device or outside the additional tube element that is connected to said cover tube in an operationally stable manner. In this variant, existing tendons can be retrofitted, in a simple manner, with the apparatus according to the invention.

The variants in which the casing tube moves in the axial and/or radial direction in relation to the longitudinal extension direction thereof may for example be implemented by a rotary drive means being arranged on one of the units, i.e. the anchoring device or the casing tube, or on an element that is connected thereto in an operationally stable manner, the output shaft of which rotary drive means supports at least one axially and/or radially acting cam element that interacts with a counter-cam surface that is arranged on the other unit in each case, i.e. the casing tube or the anchoring device, or on an element that is connected thereto in an operationally stable manner. As a result of the interaction of the cam element with the counter-cam surface, the casing tube is deflected in the axial and/or radial direction out of a starting position and, after the cam element moves out of engagement with the counter-cam surface, automatically returns to the starting position due to gravity and/or under the influence of a preload, for example generated by a pre-tensioned spring. The abrupt braking of the casing tube in the starting position generates a shock in said casing tube, which shock spreads along the casing tube and makes it easier for ice to be broken off the outer surface of the casing tube.

By appropriately selecting the speed of the rotary drive means and the number of cam elements, oscillations can additionally be generated in the casing tube in order to make it easier for the ice to be broken off the outer surface of the casing tube.

In this variant, the rotary drive means may also be formed by an electric motor for example, but also by a hydraulically and/or pneumatically operated motor.

Furthermore, in order to protect the apparatus according to the invention from weather influences, it is also advantageous in this variant for the rotary drive means, the cam element and the counter-cam surface to be arranged inside a cover tube of the anchoring device or inside an additional tube element that is connected to said cover tube in an operationally stable manner.

In order to make it possible for existing tendons to be retrofitted with the apparatus according to the invention, it is also conceivable, however, for the rotary drive means, the cam element and the counter-cam surface to be arranged outside the cover tube of the anchoring device or outside the additional tube element that is connected to said cover tube in an operationally stable manner. In this case, the counter-cam surface can be formed by the outer surface of the casing tube in a simple manner.

Alternatively, however, the variants in which the casing tube moves in the axial and/or radial direction in relation to the longitudinal extension direction thereof, can also be implemented by an axially and/or radially acting linear drive means being arranged on one of the units, i.e. the anchoring device or the casing tube, or on an element that is connected thereto, the control element of which linear drive means acts on the other unit in each case, i.e. the casing tube or the anchoring unit, or on an element that is connected thereto. When the linear drive means is actuated, the control element thereof can deflect the casing tube, counter to the gravitational force thereof, out of a starting position. Subsequently, the linear drive means can be switched into a mode without power, such that the casing tube can return to its starting position due to gravity and/or under the influence of a preload, for example generated by a pre-tensioned spring. The abrupt braking of the casing tube in the starting position generates a shock in said casing tube, which shock spreads along the casing tube and makes it easier for ice to be broken off the outer surface of the casing tube. Advantageously, the linear drive means is formed in such a way that the movement back into the starting position occurs in a substantially frictionless manner.

The linear drive means may be formed for example by a hydraulically and/or pneumatically operated cylinder piston assembly, to which a control device is allocated, which control device is designed and intended, when a predetermined extension position is reached, to switch the cylinder piston assembly into a mode without pressure and to open a substantially flow resistance-free bypass pipeline that bypasses the cylinder of the cylinder piston assembly.

In a development of the invention, it is proposed that the invention further comprise a control device that is connected both to at least one weather-detection sensor and/or at least one sensor for detecting the state of ice formation, and to the power device, specifically to the rotary drive means and/or the linear drive means. In this case, the at least one weather-detection sensor may comprise, for example, at least one temperature sensor and/or at least one wind speed sensor and/or at least one precipitation sensor. Furthermore, the at least one sensor for detecting the state of ice formation may comprise at least one camera having an associated image analysis unit. The detection signals of the at least one sensor can be analysed by the control device and used to determine an activation and/or deactivation signal to be sent to the power device.

At this point, it is again emphasised that the three variants described above, together with all developments thereof, can also be implemented in combination with one another. For example, the rotational movement that is necessary for the cam element to interact axially and/or radially with the counter-cam surface may be a continuous rotational movement of the casing tube in the circumferential direction.

According to a further aspect, the invention relates to a tendon that is provided with an apparatus according to the invention for de-icing and preventing the formation of ice.

In this case, a separate anchoring device may be allocated to each end of the tendon, each end of the tendon being able to comprise an apparatus according to the invention for de-icing and preventing the formation of ice, which apparatus interacts with the allocated anchoring device.

Furthermore, the casing tube may be formed by a tendon duct that encloses the at least one tension element of the tendon, in particular in order to protect said element from corrosion. As the space between the at least one tendon and the tendon duct is frequently filled with an anti-corrosion substance, for example fat and/or wax, which makes it more difficult for the tendon duct to move relative to the at least one tension element, the casing tube can alternatively be formed by a separate casing tube that encloses the tendon duct.

With regard to further development options and the advantages that can be achieved thereby, reference is made to the above description of the apparatus according to the invention for de-icing and preventing the formation of ice.

According to a further aspect, the invention relates to a structure comprising at least one tendon of this type. With regard to the development options and the advantages that can be achieved thereby, reference is made to the above description of the apparatus according to the invention for de-icing and preventing the formation of ice.

BRIEF DESCRIPTION OF THE DRAWINGS

Embodiments of the invention will be explained in greater detail in the following with reference to the accompanying drawings, in which.

DETAILED DESCRIPTION OF THE INVENTION

Figure 1:
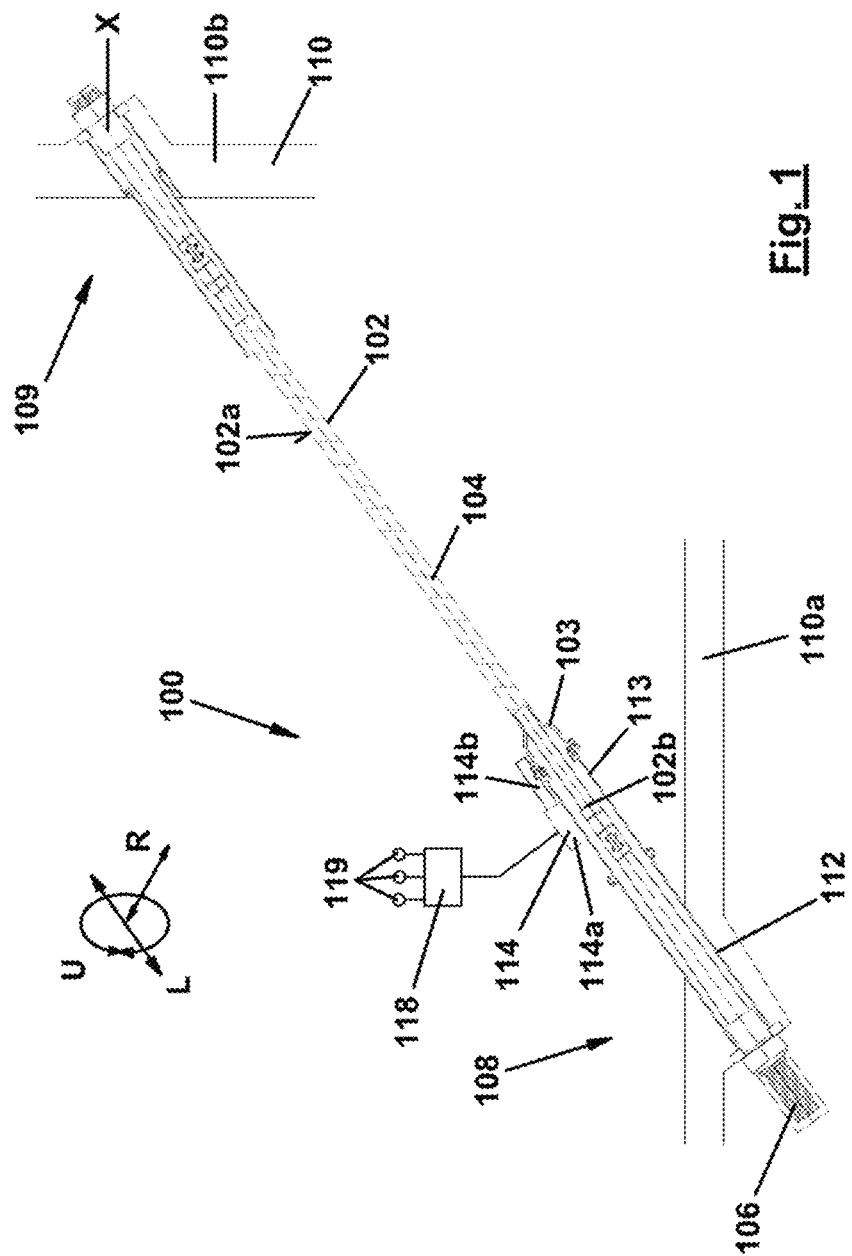
FIG. 1 is a schematic view of a structure comprising at least one tendon, an anchoring device of the tendon comprising an apparatus according to the invention for de-icing and preventing the formation of ice, and said view being used to illustrate the basic concept of the invention, which concept is common to all of the specific embodiments.

FIG. 1 shows an apparatus according to the invention for de-icing and preventing the formation of ice, generally denoted here by 100. The explanations with regard to this drawing apply correspondingly to the embodiments described hereafter and serve to explain the basic concept of the invention.

The apparatus 100 is used to de-ice the surface 102a of a casing tube 102 which is exposed to weather influences, and/or to guard against, if not completely prevent, ice forming on said casing tube. The casing tube 102 is part of a tendon 104 which, in the embodiment shown, comprises a plurality of tension elements 106 that are received in the casing tube 102. In principle, however, it is also conceivable for the tendon 104 to comprise just one single tension element 106.

The tendon 104 is anchored to a structure 110 in a manner known per se, by means of two anchoring devices 108, 109, specifically one active anchoring device 108 and one passive anchoring device 109. In this case, the structure 110 may for example be an externally pre-loaded bridge; however, it may also be any other type of structure, for the static construction of which one or more tendons 104 can be used. In the example shown, the structure 110 is a cable-stayed bridge that comprises at least one pylon 110b and a bridge floor 110a, to both of which the tendon 104 is anchored by means of the anchoring devices 108 and 109.

Because the tension elements 106 are, for anchoring purposes, usually separate and each anchored individually to the structure 110, which causes the tendon 104 to expand, the casing tube 102 ends at a specified distance in front of the anchoring device 108. However, in order to nevertheless be able to protect the tension elements 106 from weather influences, a cover tube 112 that encloses the tension elements 106 and is formed in one or more parts extends between the anchoring device 108 and the end 102b of the casing tube 102.

The casing tube 102 defines a cylindrical coordinate system having a longitudinal direction L, a radial direction R and a circumferential direction U. The longitudinal direction L extends along the longitudinal axis X of the casing tube 102, the circumferential direction U extends in the circumferential direction around the longitudinal axis X of the casing tube 102, and the radial direction R extends in the radial direction in relation to the longitudinal axis X of the casing tube 102.

According to the invention, in FIG. 1, a power device 114 is allocated to the cover tube 112, more precisely to an additional tube 113 that is connected to said cover tube in an operationally stable manner, and to the casing tube 102 or to a bell-shaped portion 103 that is connected to said casing tube in an operationally stable manner, the drive side 114a of which power device is fastened to the cover tube 112 or the additional tube 113, and the output side 114b of which power device acts on the casing tube 102 or the bell-shaped portion 103. As a result of the interaction of the cover tube 112, the casing tube 102 and the power device 114, the casing tube 102 can be moved, relative to the cover tube 112, in the circumferential direction U and/or in the longitudinal direction L and/or in the radial direction R. This movement can cause chunks of ice and/or icicles that have accumulated on one side of the casing tube 102 to break off the outer surface 102a of the casing tube 102 due to gravity and/or inertia.

The power device 114 may be a power device that is driven electrically, in particular by an electric motor, and/or hydraulically and/or pneumatically. For example, the drive side 114a of the power device 114 may be formed by an electric motor, a cylinder piston assembly or the like.

Furthermore, the apparatus for de-icing and preventing the formation of ice 100 may be equipped with a control device 118 that comprises sensors 119 and is connected to the power device 114.

The sensors 119 may comprise at least one weather-detection sensor and/or at least one sensor for detecting the state of ice formation, together denoted by 119 in FIG. 1, it being possible for the weather sensor to comprise a temperature sensor and/or a wind speed sensor and/or a precipitation sensor. Additionally, the sensor for detecting the state of ice formation may comprise a camera having an associated image analysis unit. The detection signals of the sensor or sensors 119 can be analysed by the control device 118 and used to determine an activation and/or deactivation signal to be sent to the power device 114.

This monitoring system is used to detect the ambient conditions of the tendon 104 and/or the casing tube 102 of the tendon 104 and to control the apparatus for de-icing and preventing the formation of ice 100 using the data obtained from said system. In the case of a corresponding sensor signal that indicates the formation of ice or the risk of the formation of ice, the apparatus for de-icing and preventing the formation of ice 100 actuates the power device 114 in order to cause said power device to move the casing tube 102 relative to the cover tube 112.

A specific embodiment of the apparatus according to the invention for de-icing and preventing the formation of ice, explained above in general terms with reference to FIG. 1, will be described in the following with reference to FIGS. 2 to 4. As the embodiment shown in FIGS. 2 to 4 substantially corresponds to the embodiment according to FIG. 1, analogous parts have the same reference signs in FIGS. 2 to 4 as in FIG. 1 but increased by 100. Furthermore, the embodiment in FIGS. 2 to 4 is described in the following only insofar as it differs from the embodiment according to FIG. 1, to the description of which reference is herewith otherwise explicitly made.

Figure 2:
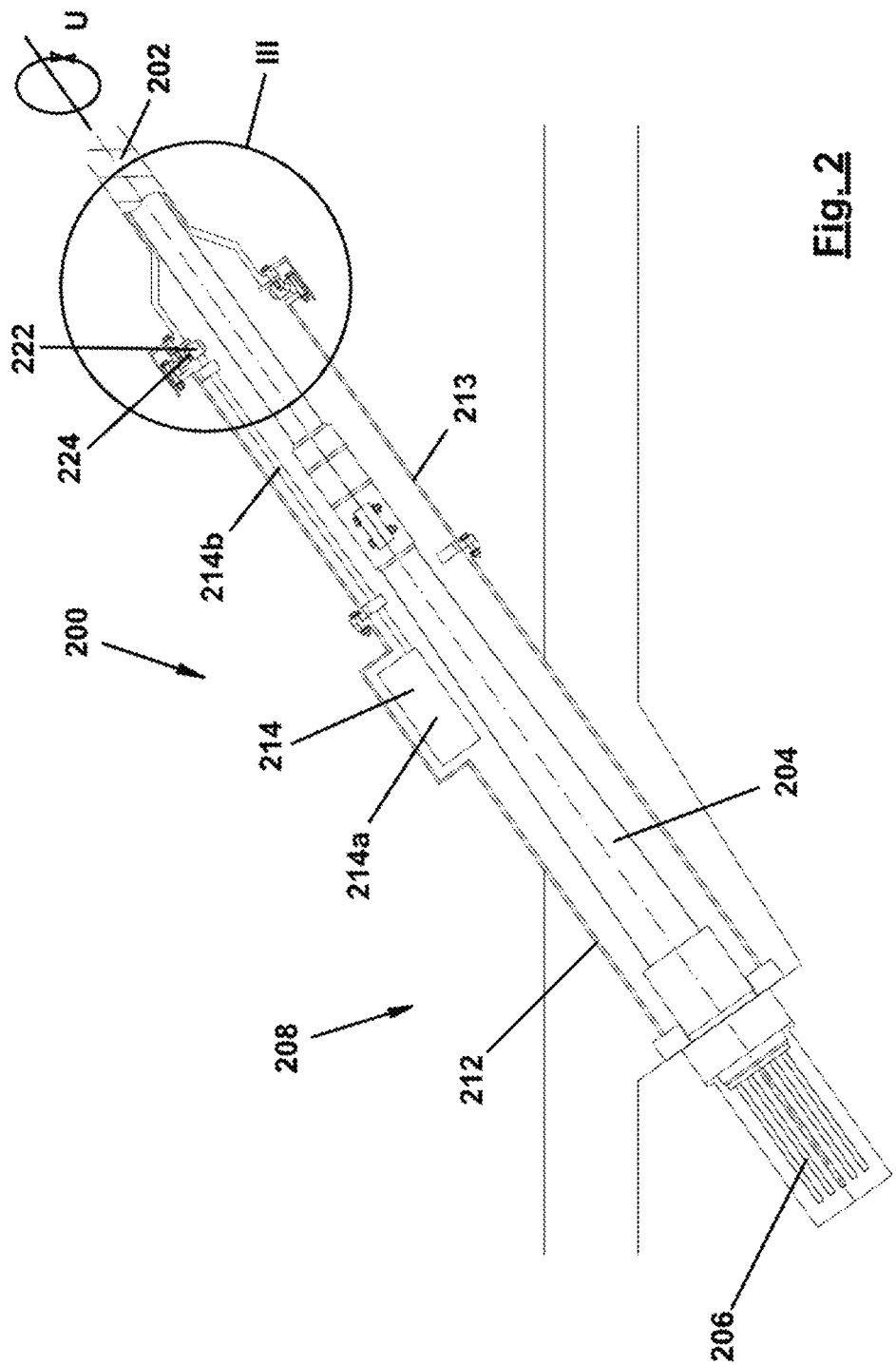
FIG. 2 is a detail view of the anchoring device of the tendon, in which an apparatus according to a first embodiment of the invention for de-icing and preventing the formation of ice is used.
Figure 3:
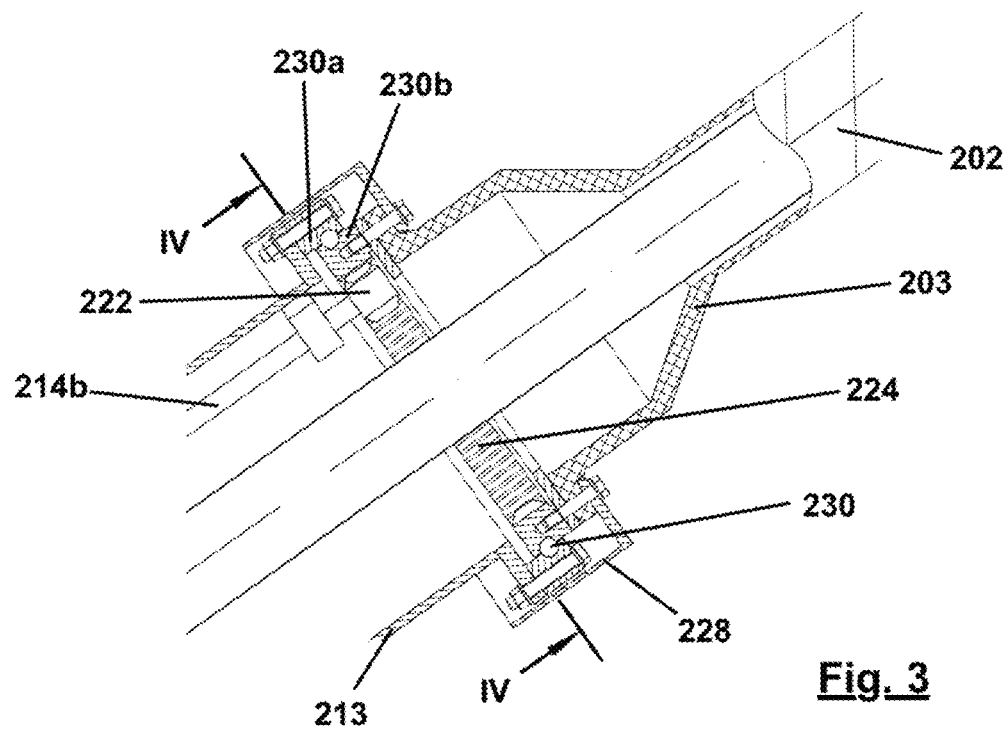
FIG. 3 is an enlarged view of the detail III in FIG. 2.
Figure 4:
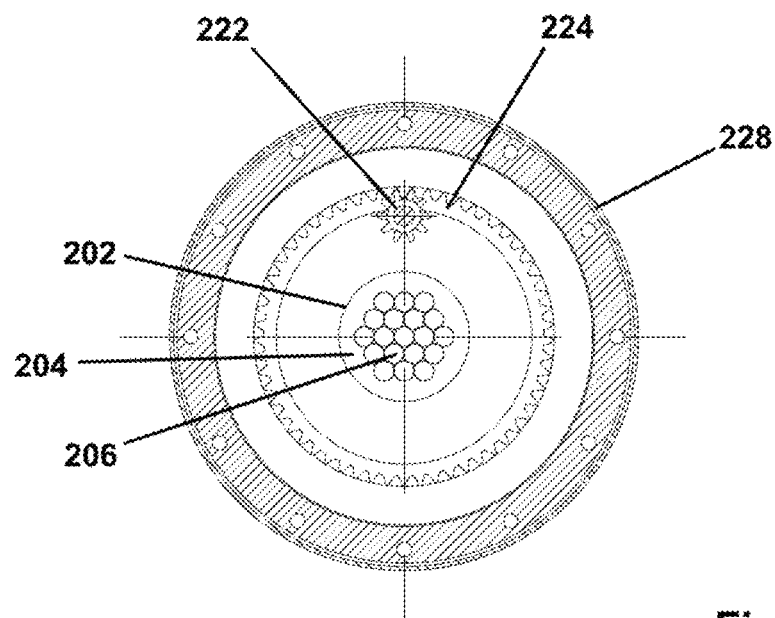
FIG. 4 is a cross-sectional view along the line IV-IV in FIG. 3.

The apparatus for de-icing and preventing the formation of ice 200 shown in the region of the anchoring device 208 in FIGS. 2 to 4 is designed to move the casing tube 202 relative to the cover tube 212 in the circumferential direction U.

For this purpose, the power device 214 may be formed by a rotary drive means. In particular, the drive side 214a of the power device 214 may comprise an electric motor that is arranged inside the cover tube 212. A pinion 222 is arranged at the free end of an output shaft 214b of the power device 214, which pinion meshes with the internal toothing of a ring gear 224 that is in turn connected to the bell-shaped portion 203 of the casing tube 202 in an operationally stable manner (see also FIGS. 3 and 4).

In order to make it possible for the casing tube 202 and/or the ring gear 224 that is connected thereto by means of the bell-shaped portion 203 to perform a rotational movement relative to the cover tube 212 and to make it possible for the casing tube 202 to be guided on the cover tube 212, a pivot bearing 230, for example a ball bearing, is provided between these parts in the embodiment in FIGS. 2 to 4, the outer bearing ring 230a of which bearing is connected, in an operationally stable manner, to the cover tube 212 or to the additional tube 213 that is connected to said cover tube, and the inner bearing ring 230b of which bearing supports the ring gear 224 and is connected to the casing tube 202 or to the bell-shaped portion 203 in an operationally stable manner.

The pivot bearing 230, the ring gear 224 and the pinion 222 can be covered by a protective cap 228 for protection against external influences, in particular weather influences.

Figure 5:
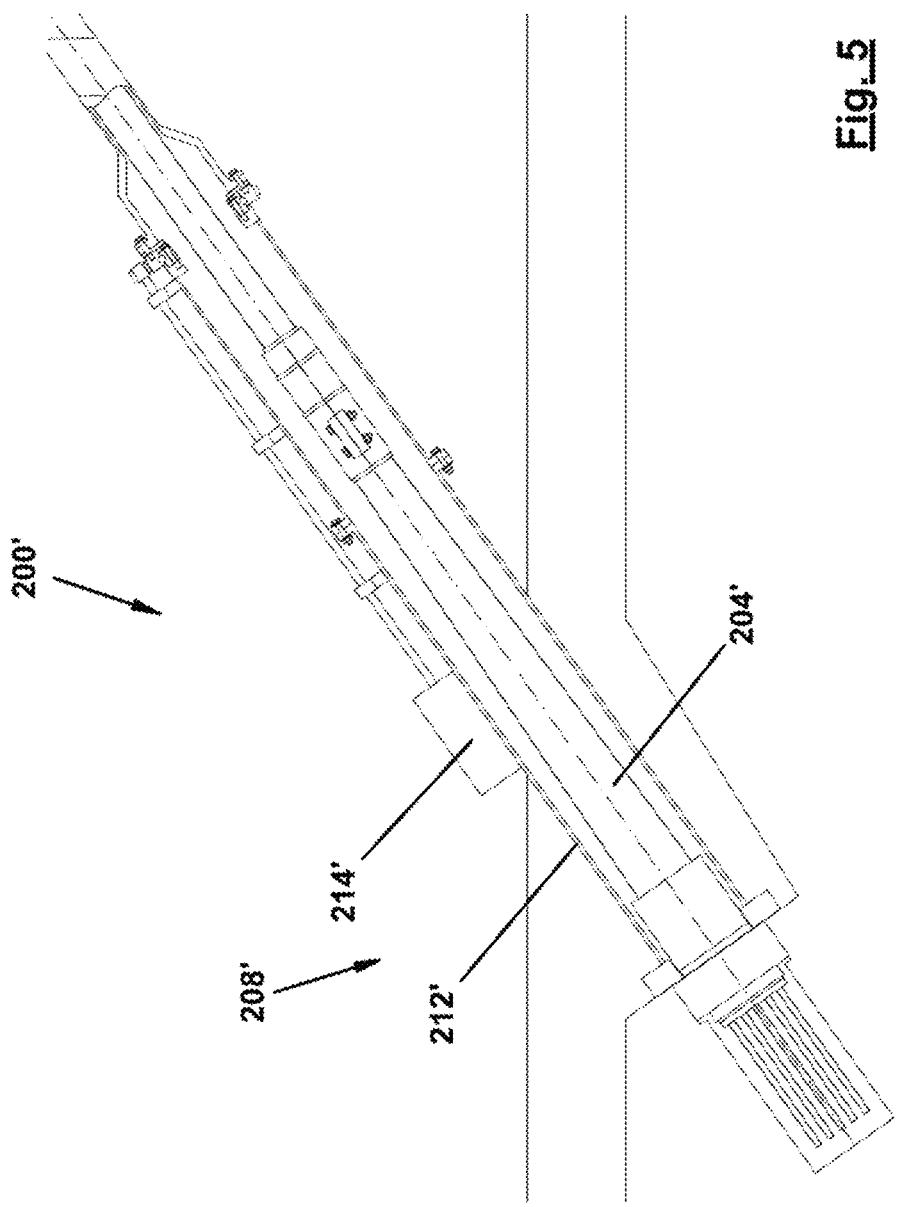
FIG. 5 is a view similar to FIG. 2, in which an apparatus according to a second embodiment of the invention for de-icing and preventing the formation of ice is used.

It should be added that the apparatus for de-icing and preventing the formation of ice 200, as illustrated in FIG. 2, is housed inside the cover tube 212. This is advantageous in that the electric motor 214a is also protected against external influences, in particular weather influences. However, it requires a cover tube 212 that is designed specifically to receive the electric motor 214a. As shown in FIG. 5, the power device 214' can, however, also be arranged on the outer surface of the cover tube 212' of the anchoring device 208' in order for it to be possible for existing tendons 204' to be retrofitted, in a simple manner, with the apparatus for de-icing and preventing the formation of ice 200'.

It should further be added that the casing tube 202 may be part of a tendon 204 in the embodiment in FIGS. 2 to 4 too, which tendon comprises a plurality of tension elements 206 that are received in the casing tube 202. In principle, however, it is also conceivable for the tendon 204 to comprise just one single tension element 206.

A further specific embodiment of the apparatus according to the invention for de-icing and preventing the formation of ice, explained above in general terms with reference to FIG. 1, will be described in the following with reference to FIGS. 6 to 8. As the embodiment shown in FIGS. 6 to 8 substantially corresponds to the embodiment according to FIG. 1, analogous parts have the same reference signs in FIGS. 6 to 8 as in FIG. 1 but increased by 200. Furthermore, the embodiment in FIGS. 6 to 8 is described in the following only insofar as it differs from the embodiment according to FIG. 1 and/or the specific embodiment according to FIGS. 2 to 4, to the description of which reference is herewith otherwise explicitly made.

Figure 6:
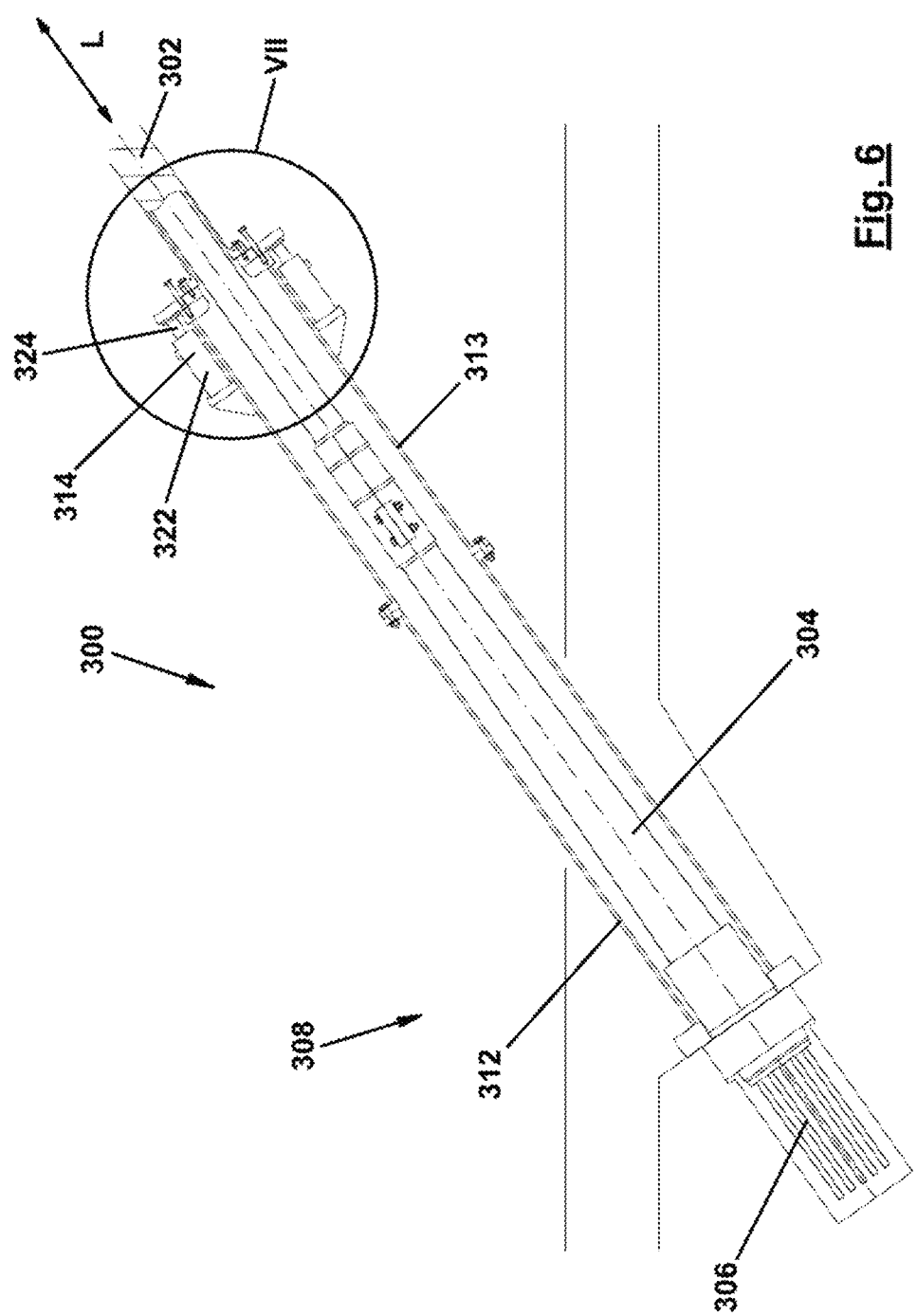
FIG. 6 is a view similar to FIG. 2, in which an apparatus according to a third embodiment of the invention for de-icing and preventing the formation of ice is used.
Figure 7:
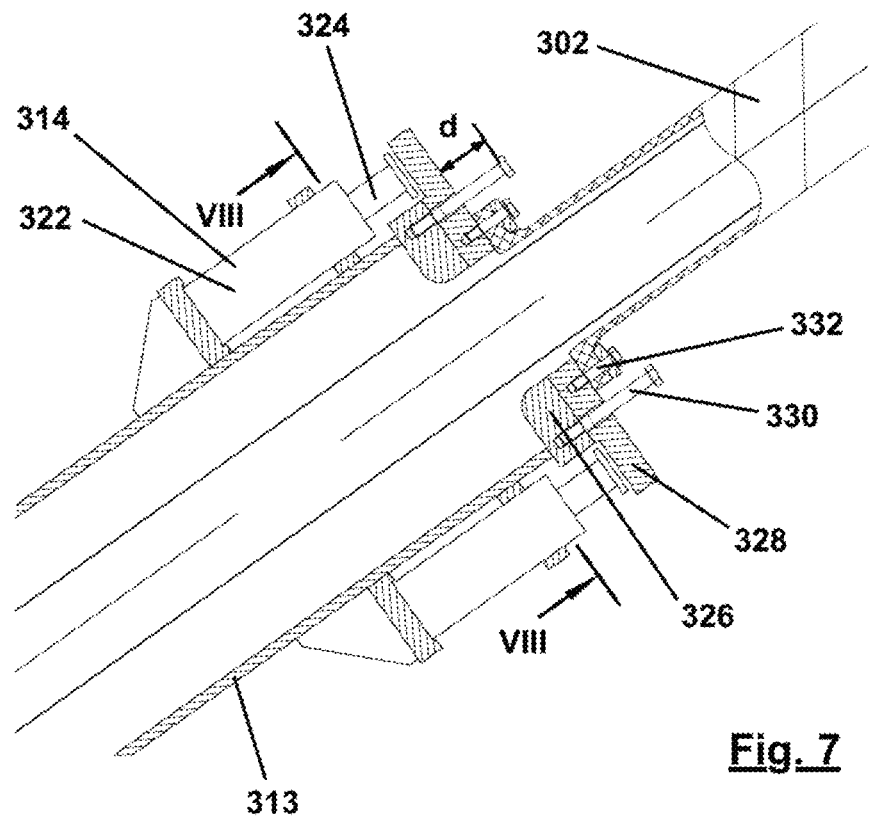
FIG. 7 is an enlarged view of the detail VII in FIG. 6.
Figure 8:
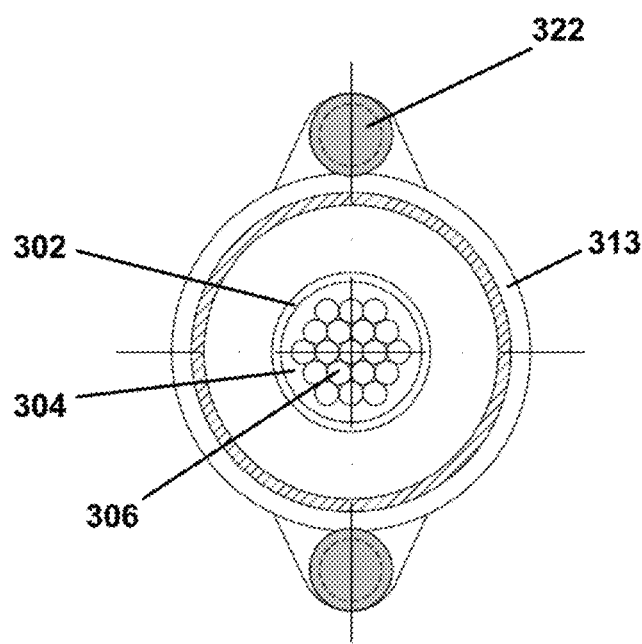
FIG. 8 is a cross-sectional view along the line VIII-VIII in FIG. 7.

The apparatus for de-icing and preventing the formation of ice 300 shown in the region of the anchoring device 308 in FIGS. 6 to 8 is designed to move the casing tube 302 in the longitudinal direction L, relative to the cover tube 312.

The power device 314 in the further embodiment, described here, of the apparatus for de-icing and preventing the formation of ice 300 may be formed by a linear drive means. The linear drive means is formed so as to act axially in this embodiment, as is clear in particular from FIGS. 6 and 7.

In the embodiment shown, the power device 314 is formed by a cylinder piston assembly that can be operated hydraulically and/or pneumatically. In particular, the cylinder 322 of the cylinder piston assembly 314, which cylinder is connected to the cover tube 312 or to the additional tube 313 in an operationally stable manner, forms the drive side 314a, while the output side 314b is formed by a piston rod 324 that is connected to the piston of the cylinder piston assembly 314.

A free end of the piston rod 324 acts on a stop plate 328 that is connected to the casing tube 302 in an operationally stable manner by means of studs 332. The stop plate 328, and therefore the casing tube 302, are guided so as to be adjustable in the longitudinal direction L, relative to the cover tube 312 and/or to the additional tube 313, by means of guide pins 330 that penetrate the stop plate 328 and are connected in an operationally stable manner to an end plate 326 of the cover tube 312 or of the additional tube 313. In this case, the free ends of the guide pins 330 limit the available stroke to a length d.

It goes without saying that any other suitable connecting or guiding means can be used instead of the pins or studs 330 and 332.

In order to move the casing tube 302 in the longitudinal direction L, relative to the cover tube 312 and/or to the additional tube 313, proceeding from the shortened starting position shown in FIG. 7, only the cylinder piston assembly 314 has to be supplied with operating fluid in order to extend the piston rod 314b out of the cylinder 314. If the stop plate 328 has reached the free end of the guide pins 330 after covering the stroke distance, the cylinder piston assembly 314 can be switched again into a mode without force, so that the casing tube 302 returns to the starting position shown in FIG. 7 due to gravity and ideally in an almost frictionless manner.

The abrupt braking of the casing tube 302 in the starting position generates a shock in said casing tube, which shock spreads along the casing tube 302 and makes it easier for ice to be broken off the outer surface of the casing tube 302.

It should also be added that the casing tube 302 may be part of a tendon 304 in the embodiment in FIGS. 6 to 8 too, which tendon comprises a plurality of tension elements 306 that are received in the casing tube 302. In principle, however, it is also conceivable for the tendon 304 to comprise just one single tension element 306.

A further specific embodiment of the apparatus for de-icing and preventing the formation of ice according to the invention, explained above in general terms with reference to FIG. 1, will be described in the following with reference to FIGS. 9 to 11. As the embodiment shown in FIGS. 9 to 11 substantially corresponds to the embodiment according to FIG. 1, analogous parts have the same reference signs in FIGS. 9 to 11 as in FIG. 1 but increased by 300. Furthermore, the embodiment in FIGS. 9 to 11 is described in the following only insofar as it differs from the general embodiment according to FIG. 1 and/or the specific embodiment according to FIGS. 2 to 4 and/or FIGS. 6 to 8, to the description of which reference is herewith otherwise explicitly made.

Figure 9:
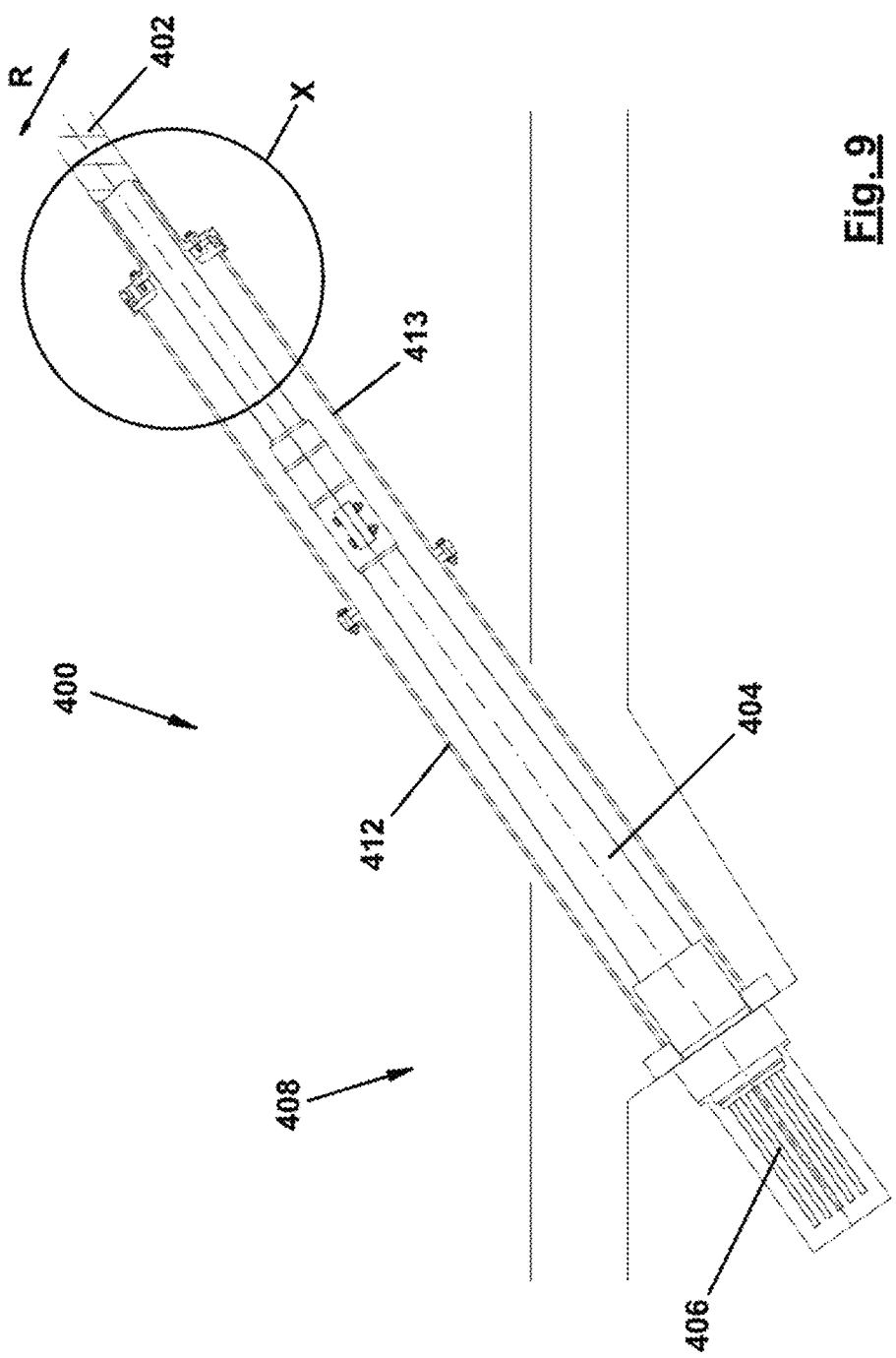
FIG. 9 is a view similar to FIG. 2, in which an apparatus according to a fourth embodiment of the invention for de-icing and preventing the formation of ice is used.
Figure 10:
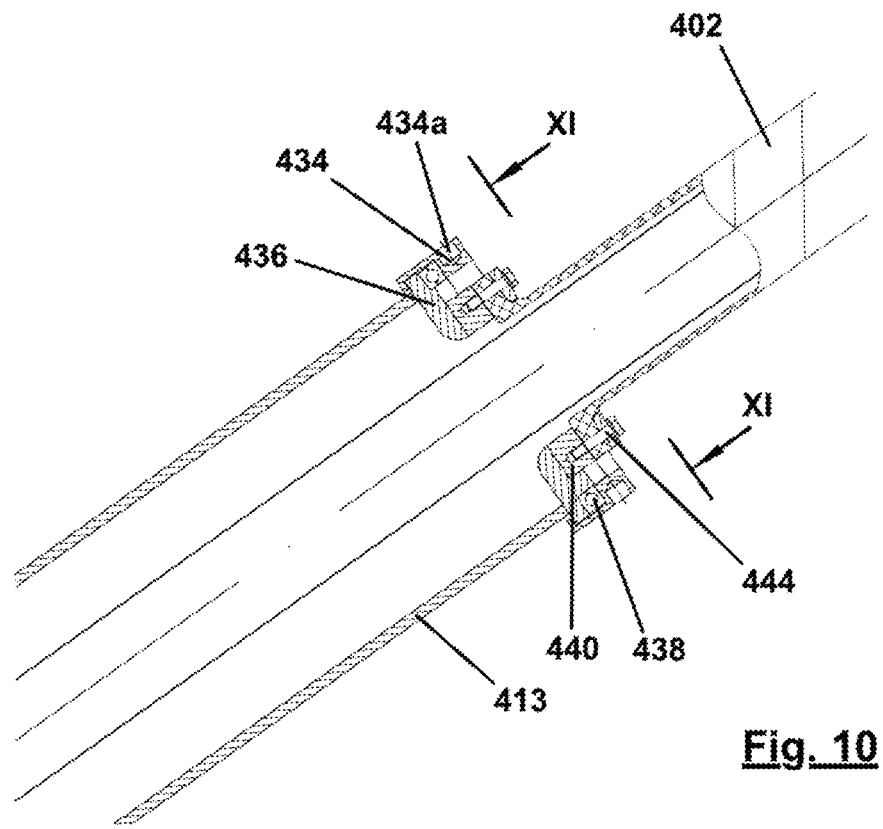
FIG. 10 is an enlarged view of the detail X in FIG. 9.
Figure 11:
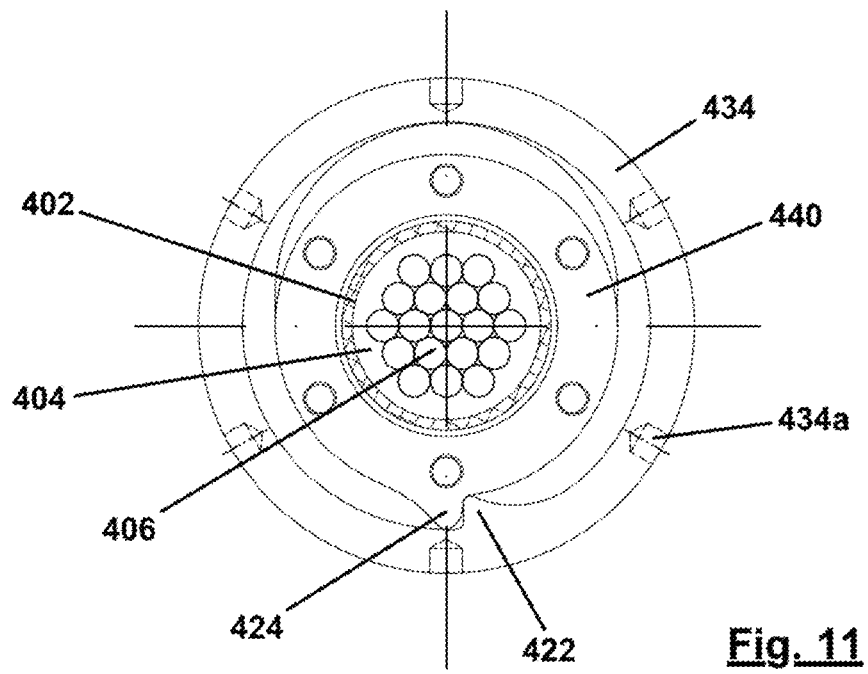
FIG. 11 is a cross-sectional view along the line XI-XI in FIG. 10.

The apparatus for de-icing and preventing the formation of ice 400 shown in the region of the anchoring device 408 in FIGS. 9 to 11 is designed to move the casing tube 402 in the radial direction R, relative to the cover tube 412 and/or to the additional tube 413.

In order to implement this movement, the power device (not shown) is formed by a rotary drive means that rotatably drives a cam disc 434 having at least one cam element 422. The cam disc 434 is rotatably mounted on a bearing plate 436 by means of a pivot bearing 438, which bearing plate is connected to the additional tube 413 in an operationally stable manner. Threaded holes 434a for fastening a ring gear (not shown) can be seen in FIGS. 10 and 11, on which ring gear the rotary drive means for rotatably driving the cam disc 434 can act. In principle, however, the rotation could also occur by means of rods inserted into the holes 434a. Furthermore, a counter-cam disc 440, which supports at least one counter-cam element 424, is connected to the casing tube 402 by means of studs 444.

If the power device causes the cam disc 434 to perform a rotational movement, as a result of which the cam element 422 is also rotated, specifically anticlockwise in the view in FIG. 11, the cam element 422 thus engages with the counter-cam element 424. As a result, the counter-cam disc 440, and therefore the casing tube 402, are deflected upwards in FIG. 11. If the cam element 422 has moved past the counter-cam element 424, the casing tube 402 abruptly returns, in the radial direction R, to the position shown in FIG. 11. As a result, a shock is generated in the casing tube 402, which shock spreads along the casing tube 402 and makes it easier for ice to be broken off the outer surface of the casing tube 402.

It should also be added that the casing tube 402 may be part of a tendon 404 in the embodiment in FIGS. 9 to 11 too, which tendon comprises a plurality of tension elements 406 that are received in the casing tube 402. In principle, however, it is also conceivable for the tendon 404 to comprise just one single tension element 406.

The invention claimed is:

1. Apparatus for de-icing a surface of a casing tube of a tendon exposed to weather influences or to guard the case tube against ice forming, the tendon being anchored to a structure by an anchoring device, said apparatus comprising a power device, one end of which is directly or indirectly in force transmitting engagement with the anchoring device and the other end of said power device is directly or indirectly in force transmitting engagement with the casing tube, and said power device is configured to move the casing tube relative to the anchoring device in a circumferential direction, in relation to a longitudinal extension direction of the casing tube.

2. Apparatus according to claim 1, wherein a rotary drive is arranged directly or indirectly on one of the anchoring device or the casing tube, the output shaft of the rotary drive supports a force transmitting element that interacts with an opposing force transmitting element that extends in the circumferential direction of the casing tube and is arranged directly or indirectly on the other of the anchoring device or the casing tube.

3. Apparatus according to claim 2, wherein the opposing force transmitting element extends over an entire 360°.

4. Apparatus according to claim 2, wherein the anchoring device, or an element that is connected thereto in an operationally stable manner, and the casing tube, or an element that is connected thereto in an operationally stable manner, interact via a pivot bearing.

5. Apparatus according to claim 1, further comprising a rotary drive, wherein the rotary drive, and parts that interact therewith, are arranged inside a cover tube of the anchoring device or inside an additional tube element that is connected to said cover tube in an operationally stable manner.

6. Apparatus according to claim 1, further comprising a rotary drive, wherein the rotary drive, and parts that interact therewith, are arranged outside a cover tube of the anchoring device or outside an additional tube element that is connected to said cover tube in an operationally stable manner.

7. Apparatus according to claim 1, wherein said apparatus further comprises a control device that is connected both to at least one weather-detection sensor and/or at least one sensor for detecting the state of ice formation, and to a power device including a rotary drive.

8. Tendon for anchoring to a structure by an anchoring device, said tendon comprising an apparatus including a power device, one end of which is directly or indirectly in force transmitting engagement with the anchoring device, and the other end of said power device is directly or indirectly in force transmitting engagement with a casing tube, and said power device is configured to move the casing tube relative to the anchoring device in a circumferential direction, in relation to a longitudinal extension direction of the casing tube.

9. Tendon according to claim 8, wherein a separate anchoring device being allocated to each of the ends of said tendon, wherein each end of the tendon comprises a respective apparatus interacting with the allocated anchoring device.

10. Tendon according to claim 8, wherein at least one tension element of the tendon is enclosed by a tendon duct, or by a separate casing tube that encloses the tendon duct.

11. Structure comprising at least one tendon according to claim 8.

* * * * *